(12) United States Patent
Soon-Shiong

(10) Patent No.: US 10,997,626 B2
(45) Date of Patent: *May 4, 2021

(54) AUGMENTED PRE-PAID CARDS, SYSTEMS, AND METHODS

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,794

(22) Filed: Nov. 20, 2019

(65) Prior Publication Data

US 2020/0090215 A1 Mar. 19, 2020

Related U.S. Application Data

(63) Continuation of application No. 14/243,833, filed on Apr. 2, 2014, now Pat. No. 10,521,817.

(51) Int. Cl.
*G06Q 30/02* (2012.01)
*G06Q 20/34* (2012.01)

(52) U.S. Cl.
CPC ....... *G06Q 30/0253* (2013.01); *G06Q 20/342* (2013.01); *G06Q 20/346* (2013.01); *G06Q 30/0276* (2013.01)

(58) Field of Classification Search
None
See application file for complete search history.

(56) References Cited

U.S. PATENT DOCUMENTS 7,991,157 B2 8/2011 Rhoads
8,540,151 B1 9/2013 Snyder et al.
(Continued)

FOREIGN PATENT DOCUMENTS

EP 1 365 358 A2 11/2003
EP 2 629 258 A1 8/2013
(Continued)

OTHER PUBLICATIONS

International Search Report and Written Opinion, International Application No. PCT/US2015/024154, dated Jun. 30, 2015, 13 pages.
(Continued)

*Primary Examiner* — Marie P Brady
(74) *Attorney, Agent, or Firm* — Mauriel Kapuytian Woods LLP; Lana Akopyan; Andrew A. Noble

(57) ABSTRACT

Pre-paid transaction card systems and methods are described. A transaction system can include a transaction database to store transaction objects that represent characteristics of a pre-paid transaction card. A deal engine communicatively coupled with the transaction database can receive an image of a marker-less portion of the transaction card and derive a set of image descriptors from the marker-less portion. The deal engine can also identify transaction characteristics associated with the card from the transaction database using the image descriptors. In addition, the deal engine can construct a deal recommendation based on the transaction characteristics previously identified. The deal recommendation can be transmitted to a user, and in some cases, displayed to the user as an augmented reality image.

28 Claims, 6 Drawing Sheets

(56) References Cited

U.S. PATENT DOCUMENTS

| | | | |
|---|---|---|---|
| 8,577,153 B2 | 11/2013 | Duan et al. | |
| 8,606,645 B1 | 12/2013 | Applefeld | |
| 8,942,420 B2* | 1/2015 | Kim | G06K 9/72 382/103 |
| 9,514,380 B2* | 12/2016 | Takacs | G06F 16/583 |
| 10,521,817 B2 | 12/2019 | Soon-Shiong | |
| 2002/0046341 A1 | 4/2002 | Kazaks et al. | |
| 2003/0004997 A1 | 1/2003 | Parker et al. | |
| 2008/0074424 A1* | 3/2008 | Carignano | G06T 13/80 345/473 |
| 2008/0194323 A1 | 8/2008 | Merkli et al. | |
| 2010/0246969 A1 | 9/2010 | Winder et al. | |
| 2011/0055049 A1 | 3/2011 | Harper et al. | |
| 2011/0106698 A1 | 5/2011 | Isaacson et al. | |
| 2011/0238483 A1 | 9/2011 | Yoo et al. | |
| 2012/0022924 A1* | 1/2012 | Runnels | G06Q 30/02 705/14.4 |
| 2012/0143760 A1* | 6/2012 | Abulafia | G06Q 20/42 705/44 |
| 2012/0275705 A1* | 11/2012 | Duan | G06K 9/00664 382/195 |
| 2013/0022231 A1 | 1/2013 | Nepomniachtchi et al. | |
| 2013/0024371 A1* | 1/2013 | Hariramani | G06Q 20/384 705/41 |
| 2013/0204739 A1 | 8/2013 | Friedman | |
| 2013/0218721 A1 | 8/2013 | Borhan et al. | |
| 2013/0232004 A1 | 9/2013 | Sunde et al. | |
| 2013/0232017 A1 | 9/2013 | Nathanel et al. | |
| 2014/0003712 A1* | 1/2014 | Eid | G06K 9/4647 382/164 |
| 2014/0076965 A1* | 3/2014 | Becorest | G06Q 20/342 235/380 |
| 2014/0081769 A1* | 3/2014 | Wilen | G06Q 20/3437 705/14.66 |
| 2014/0129336 A1 | 5/2014 | Bailey | |

FOREIGN PATENT DOCUMENTS

| | | |
|---|---|---|
| JP | 2002175475 A | 6/2002 |
| JP | 4916276 B | 2/2012 |
| JP | 5236055 B | 4/2013 |
| JP | 5433397 B | 12/2013 |
| WO | 2011084720 A2 | 7/2011 |
| WO | 2013126221 A1 | 8/2013 |

OTHER PUBLICATIONS

International Preliminary Report on Patentability, International Application No. PCT/US2015/024154, dated May 10, 2016, 5 pages.
Notice of Grounds for Rejection, Korean Patent Application No. 10-2016-7030546, dated Aug. 11, 2017, 21 pages.
Extended European search report, European Patent Application No. 15772231.5, dated Sep. 8, 2017, 10 pages.
Notice of Allowance, Japanese Patent Application No. 2016-560591, dated Jan. 30, 2018, 3 pages.
Notice of Final Rejection, Korean Patent Application No. 10-2016-7030546, dated Feb. 12, 2018, 8 pages.
Office Action, Canadian Patent Application No. 2,944,648, dated Apr. 15, 2019, 5 pages.
Examination report No. 2, Australian Patent Application No. 2018203742, dated Aug. 22, 2019, 4 pages.
Notice of Grounds for Rejection, Korean Patent Application No. 10-2016-7030546, dated Sep. 23, 2019, 6 pages.
Office Action, European Patent Application No. 15 772 231.5, dated Nov. 13, 2019, 12 pages.
Office Action, Canadian Patent Application No. 2,944,648, dated May 9, 2018, 4 pages.
Examination report No. 2, Australian Patent Application No. 2015240597, dated May 21, 2018, 3 pages.
Office Action issued in Australian Application No. 2018203742 dated Jun. 2, 2020, 3 pages.
Office Action issued in Indian Application No. 201627036722 dated Jun. 12, 2020, 6 pages.
Office Action issued in Chinese Application No. 201580017685.3 dated Feb. 28, 2020, 13 pages.
Office Action issued in Australian Application No. 2018203742 dated Apr. 6, 2020, 4 pages.
Office Action issued in Chinese Application No. 2015800176853 dated Jul. 31, 2020, 11 pages.
Office Action issued in Chinese Application No. 201580017685.3 dated Nov. 18, 2020, 13 pages.

* cited by examiner

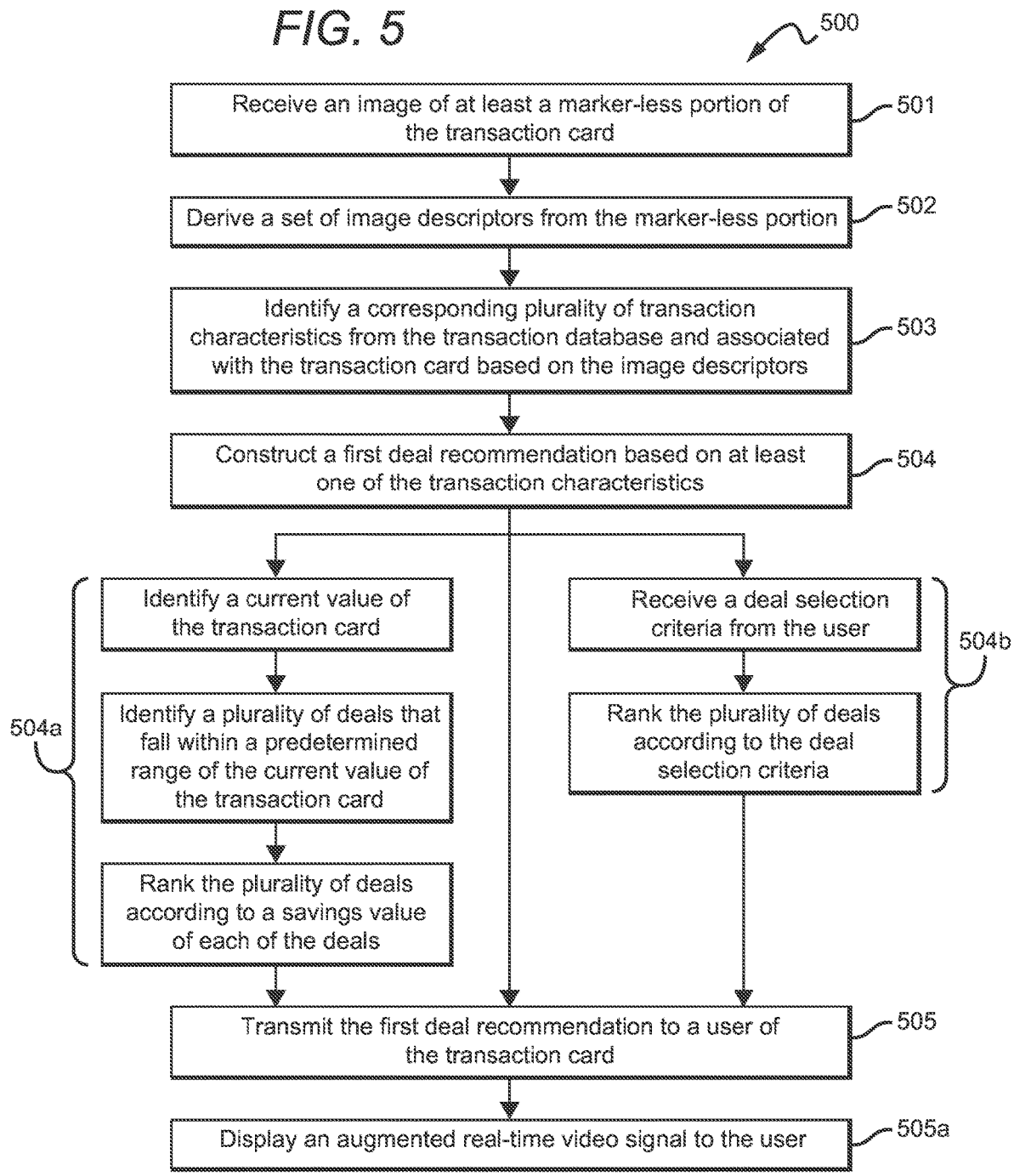

AUGMENTED PRE-PAID CARDS, SYSTEMS, AND METHODS

CROSS REFERENCE TO RELATED APPLICATIONS

This application is a continuation application of U.S. application Ser. No. 14/243,833 filed on Apr. 2, 2014. The entire contents of these applications are hereby incorporated herein by reference.

FIELD OF THE INVENTION

The field of the invention is transaction card systems and methods.

BACKGROUND

The following description includes information that may be useful in understanding the present invention. It is not an admission that any of the information provided herein is prior art or relevant to the presently claimed invention, or that any publication specifically or implicitly referenced is prior art.

Pre-paid transaction cards have become a popular way of gifting money and engaging in financial transactions. Pre-paid transaction cards provide many advantages over other transaction methods. For example, pre-paid transaction cards can have a limited purchasing value that is disconnected from the user's other accounts. This allows the user to control the amount of spending and protects the user's other accounts from theft. Pre-paid transaction cards are also very convenient to use since it eliminates the need to exchange hard currency or write a check. In addition, debit and credit events are performed digitally, which allows for automatic balance calculations and easy electronic tracking of purchases.

One disadvantage of pre-paid transaction cards is that, in the context of gifting, a pre-paid gift card may not produce the same level of surprise and excitement as a wrapped gift. Some effort has been directed toward this problem. For example, US Patent Application No. 2011/0055049 to Harper et al. describes a system that provides an augmented reality experience in connection with a gift card. The system receives an image of the gift card, searches for a marker on the gift card, and uses the marker to track the position of the card. The system can then create an augmented view of the gift card in a user display, such as by placing a graphical representation of a consumer good or service next to the gift card image. While advantageous in some aspects, the system in Harper is limited in application to only those transaction cards that have markers. In addition, the system in Harper fails to leverage user data such as transactional histories, user preferences/profiles, and gifting scenarios, to provide targeted deal offers.

What is needed is a transaction system that manages transactional and user-related information, generates personalized deal recommendations, and displays the recommendations to the user in a fun and exciting way.

Harper and all other publications and extrinsic materials identified herein are incorporated by reference in their entirety, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for pre-paid transaction card systems and methods.

SUMMARY OF THE INVENTION

The inventive subject matter provides apparatus, systems and methods in which a transaction system for pre-paid transaction cards includes a transaction database and a deal engine communicatively coupled with the transaction database. The transaction database stores a plurality of transaction objects, wherein each object represents a transaction characteristic(s) of one or more transaction cards. In some instances, the transaction objects are image descriptors that represent characteristics of a marker-less portion of a transaction card(s). The transaction objects are stored according to associated image descriptors to facilitate identifying transaction objects associated with a particular pre-paid card.

The deal engine is configured to receive an image of at least a marker-less portion of a pre-paid transaction card and derive a set of image descriptors from the marker-less portion, which can then be stored on the transaction database. The deal engine is also configured to identify a plurality of transaction characteristics (i.e., transaction objects in the transaction database) that correspond with the transaction card using the image descriptors. The deal engine is further configured to construct a first deal recommendation based on at least one of the transaction characteristics previously identified, and transmit the first deal recommendation to a user of the transaction card. In some embodiments, the recommendation is transmitted to the user as an augmented real-time image signal.

From a methods perspective, the inventive subject matter includes methods of facilitating redemption of a transaction card. Contemplated methods include the steps of receiving an image of a marker-less portion of a transaction card and deriving a set of image descriptors from the marker-less portion. Contemplated methods also include the steps of identifying a corresponding plurality of transaction characteristics from the transaction database and associated with the transaction card based on the image descriptors, constructing a first deal recommendation based on at least one of the transaction characteristics, and transmitting the first deal recommendation to a user of the transaction card.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1b is a back side view of the pre-paid transaction card of FIG. 1a.

FIG. 5 is a schematic of another method of facilitating redemption of pre-paid transaction card.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
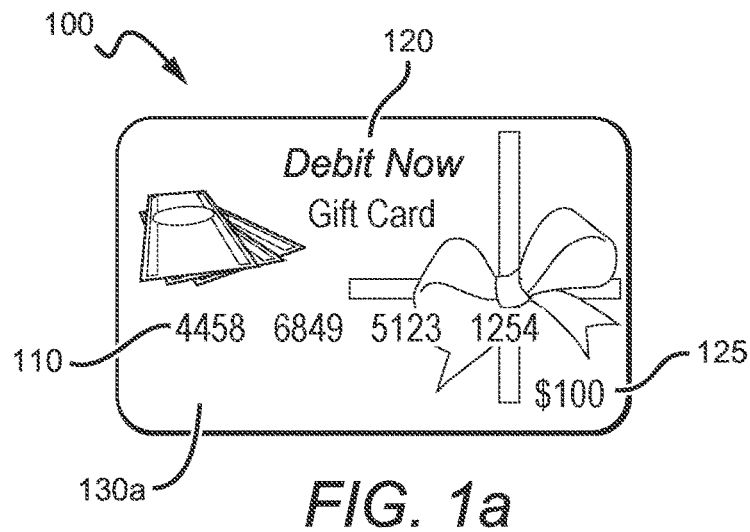
FIG. 1a is a front side view of one embodiment of a pre-paid transaction card that has a marker-less portion.

FIG. 1a shows a front side view of a pre-paid transaction card 100. Card 100 is a financial instrument that can be used to conduct a financial transaction with vendors and/or financial institutions. Numerous types of transaction cards are currently known, including debit cards, credit cards, gift cards, pre-paid cards, electronic tokens, digital cards, and the like. See, for example, U.S. Pat. No. 8,540,151; US Patent Application Nos. 2013/0232004 and 2013/0232017; and European Patent Application No. EP12155850, all of which are incorporated herein by reference.

The embodiment of card 100 as shown in FIG. 1 includes an account number 110 comprising a numeric string. Account number 110 allows a banking or financial service to track funds associated with card 100. Card 100 also has a text 120 that can be used to identify a banking institution, financial service, card sponsor, retailer, product brand, or any other associated entity or data. In addition, card 100 has a currency amount 125 associated with the card (e.g., initial card value, upper limit on card value, maximum possible value, etc.).

Card 100 also has at least one marker-less portion 130a. As used herein, the term "marker-less portion" refers to a feature, attribute, or characteristic that has not been pre-designated as a recognizable identifier, symbol, or marker per se. For example, a marker-less portion might include a logo, texture, or other feature while a name, bar code, and MICR line would be a marker. The marker-less portion could be considered an object rather than symbol. Marker-less portion 130a can comprise any object, feature, attribute, and/or characteristic of the card that is not pre-designated as a recognizable identifier object. For example, the characteristics of marker-less portion 130a have not been pre-stored in a lookup database in an object-specific manner for identification purposes. In the particular embodiment shown in FIG. 1, marker-less portion 130a is an area of the front side of card 100 that lacks textual or symbolic graphical data (e.g., bar codes). However, in alternative embodiments, marker-less portion 130a could comprise a portion of card 100 that contains text, numbers, logos, symbols, color schemes, or any other feature that is visually discernible and describable. The feature could be "visually discernible" by a human or by a device (e.g., optical camera, UV camera, IR camera, scanning electron microscopes, transmission electron microscopes, lenses, photoelectric sensors, etc.). The function of marker-less portion 130a will be described later on in more detail.

While the deal recommendation engines and processes described herein utilize marker-less portions of a transaction card to derive image descriptors, those of ordinary skill in the art will appreciate that deal recommendation engines and processes could additionally utilize markers (i.e., marker portions), in combination with marker-less portions, to derive image descriptors.

Figure 1B:
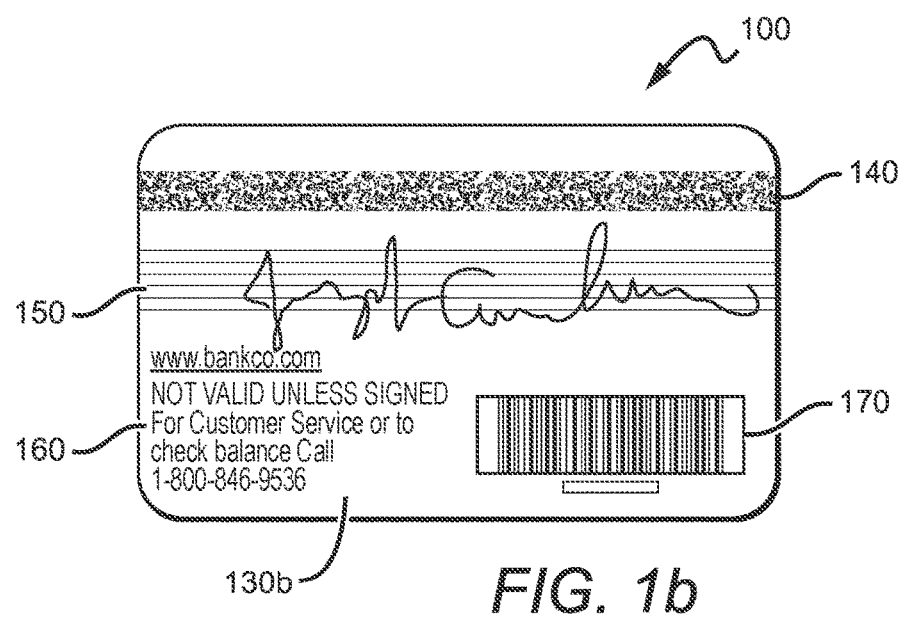

FIG. 1b shows a back side view of card 100. The back side of card 100 has an electronically readable (e.g., scan-able) magnetic stripe 140, a signature block 150, text 160, barcode 170 and a marker-less portion 130b. Stripe 140 has data magnetically stored therein and can be used by a vendor or financial institution with a magnetic reading head to initiate a financial transaction. Signature block 150 is used by the vendor or financial institution to verify the card user's identity. Text 160 provides contact information relating to the banking institution or sponsor associated with card 100. Barcode 170 provides a secondary means for initiating a transaction or for identifying a card, card user, or card sponsor.

Card 100 could take on various forms without departing from the inventive concepts described herein, so long as card 100 is configured to facilitate a financial transaction in some way and has a marker-less portion. For example, while card 100 is shown in FIG. 1 as a thin, rectangular-shaped card with rounded corners, card 100 could have any other conceivable shape (e.g., round, square, triangular, diamond, irregular, spherical, pyramid, frustoconical, etc.) or physical attribute suitable for facilitating a financial transaction. The particular shape, size, and dimensions of card 100 as shown in FIGS. 1a and 1b are not intended to limit the scope of the disclosure unless specifically referenced in the claims.

Moreover, card 100 could include other features in addition to, or in lieu of, the features shown in FIGS. 1a and 1b, without departing from the inventive concepts described herein. For example, card 100 could include an image of the user, a fingerprint of the user, a verification/authentication hologram, a logo, a QR code, and/or a card verification value (CVV). Those of ordinary skill in the art will appreciate that security features and other attributes of financial instruments have changed over time and will continue to change. As such, the particular features of card 100 could vary significantly without departing from the inventive concepts herein, as long as card 100 has a marker-less portion and can be used to facilitate a transaction.

Conventional transaction cards are typically made of plastic, however, card 100 could be made of any material suitable for use as a financial transaction card. Other materials may include, but are not limited to, composites, wood, metal alloys, ceramics, and biodegradable fibrous materials.

In general, current state of the art transaction cards are physical and tangible objects. However, as the use of ecommerce and mobile devices rises, digital transaction cards may become more prominent in financial transactions. As such, in some embodiments card 100 could comprise a digital or virtual transaction card comprising an image of a transaction card displayed on a smart phone, tablet, or other electronic device having an electronic display. So long as the digital or virtual card has a marker-less portion that is visually discernible (e.g., by a human or by a machine), such cards are contemplated and can be used consistently with the inventive principles described herein.

Figure 2A:
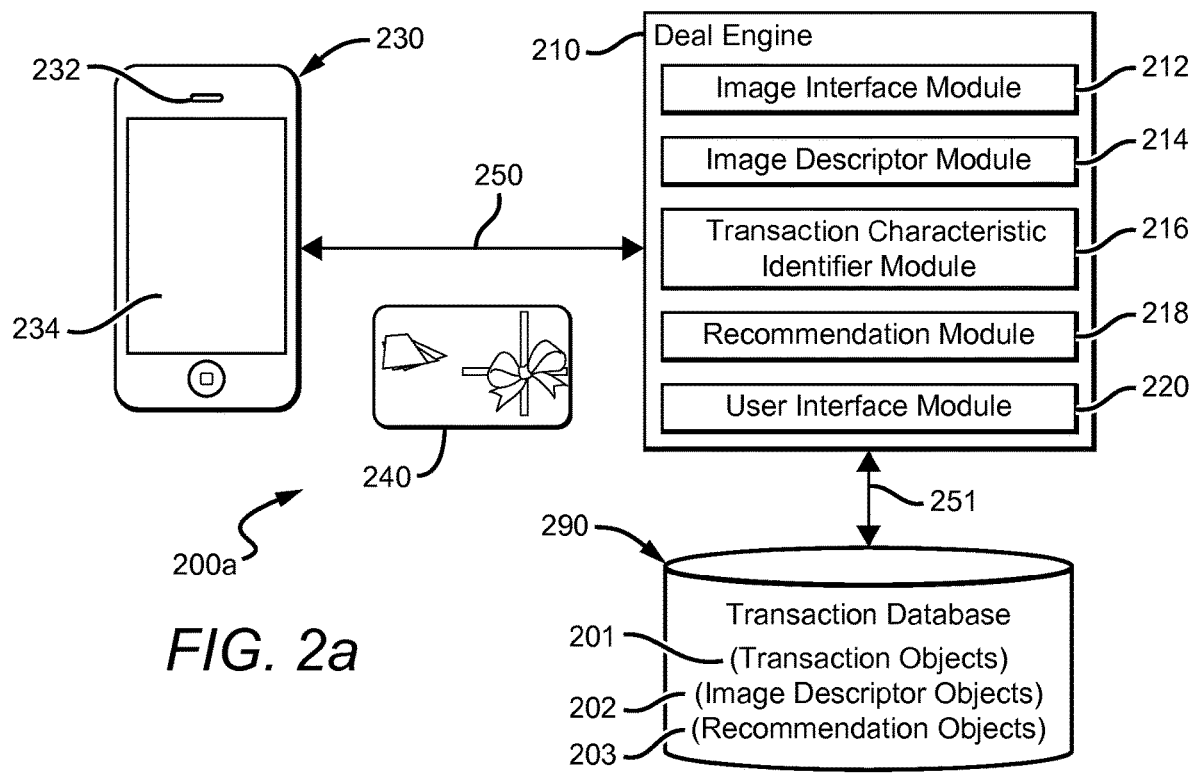
FIG. 2a is a schematic of a transaction system for pre-paid transaction cards.

FIG. 2a shows a schematic of a system 200 for facilitating a financial transaction. System 200 includes a user device 230 communicatively coupled with a deal engine 210 via connection 250. User device 230 is shown as a smart phone that has an image capture device 232 (e.g., camera) and a user interface 234. However, user device 230 could be a laptop, tablet, fablet, desktop computer, or any other electronic device that has a user interface and is capable of capturing and transmitting an image.

Using image capture device 232, the user captures an image of transaction card 100 (or at least a portion of card 100 that includes marker-less portion 130), as shown by image 240. Using interface 234, the user then transmits image 240 to deal engine 210 via connection 250. Connection 250 establishes an electronic communication link between (i) image capture device 232 and deal engine 210, and (ii) user interface 234 and deal engine 210. Deal engine 210 is communicatively coupled with transaction database 290 via connection 251. Connections 250 and 251 can comprise a wired connection, wireless connection, local area network connection, wide area network connection, or any combination thereof, and may include various communication protocols (e.g., IPX/SPX, X.25, AX.25, AppleTalk TCP/IP, Bluetooth®) and hardware (e.g., links, gateways, routers, switches, wireless towers, internet service providers, cellular networks, etc.).

Deal engine 210 comprises a set of electronically executable software instructions stored on a non-transitory storage medium and organized into different modules (e.g., modules 212, 214, 16, 218, 220) according to functions and/or desired outcomes. Deal engine 210 can be stored on transaction database 290 or on some other storage device (including a storage device within user device 230). Deal engine 210 could also be stored on multiple storage devices/databases, either in redundancy, in a distributed manner, or combinations thereof.

Image interface module 212 is configured to receive image 240 from user device 230 (and image capture device 232) and optionally (i) store image 240 on transaction database 290 and (ii) prepare image 240 for image description (e.g., crop, trim, resize, rotate, adjust levels/brightness/contrast/gamma, etc.).

Once image 240 is received by module 212, image descriptor module 214 is configured to derive a set of image descriptors from the marker-less portion 130 in image 240 and optionally save the set of image descriptors as a plurality of image descriptor objects 202 on transaction database 290. Module 214 may utilize various image descriptor algorithms, processes, and methods. For example, module 214 could employ scale-invariant feature transform (SIFT), features from accelerated segment test (FAST), binary robust independent elementary feature (BRIEF), oriented fast and rotated BRIEF (ORB), binary robust invariant scalable keypoints (BRISK), fast retina keypoint (FREAK), speed-up robust feature (SURF), visual simultaneous localization and mapping (vSLAM), simultaneous localization and mapping (SLAM), based upon related sequence types (BURST), or any combinations thereof.

Transaction characteristic identifier module 216 is configured to identify one or more of the transaction objects 201 that are stored on transaction database 290, which are related to image 240 and card 100. Transaction objects 201 are stored according to associated image descriptor objects 202, possibly according to a k-d tree or spill tree arranged according to the dimension of interest of the descriptors. By comparing the image descriptors derived by module 214 with the image descriptor objects 202 associated with various transaction cards, module 216 can identify one or more of the transaction objects 201 that correspond to image 240 and card 100.

Recommendation module 218 is configured to construct a first deal recommendation based on at least one of the transaction characteristics identified by module 216. Recommendation module 218 is optionally configured to store the first deal recommendation (and subsequent deal recommendations) on transaction database 290 as recommendation objects 203.

The first deal recommendation could include a suggested product or service that may be of interest to the owner or user of card 100. The recommendation could also include suggestions on where to shop or how to shop (e.g., online, in-store, etc.). The recommendation could also include how much money to spend within a certain time frame (e.g., in one day), how much money to spend at a specific store, or how much money to spend on a certain category of goods/services (e.g., food, home utilities, movies, gambling, etc.).

The first deal recommendation could be based on various transaction characteristics associated with card 100. For example, the transaction characteristics could include data that is unique to a user, such as the user's profile (e.g., gender, age, interests, occupation, religion, ethnicity, race, etc.), spending habits, spending history, or pre-defined preferences. The transaction characteristics could also include data that is unique to the original purchaser of the transaction card (e.g., parent, giftor, etc.). In addition, the transaction characteristics could include data that is unique to the card, such as card value, date of purchase (e.g., near a holiday, end of month, beginning of month, near a payday, etc.), maximum credit line amount, card sponsor (Visa, Master Card, American Express), location where card was purchased, how card was purchased/funded (e.g., cash purchase, credit card purchase, debit card purchase), or any other related data.

In some embodiments, one or more of image descriptor objects 202 may be bound to (e.g., associated with) one or more of a time, location, context, a deal, and/or a promotion to facilitate construction of the first deal recommendation.

User interface module 220 is configured to transmit the first deal recommendation to a user of the transaction card.

In some embodiments, module 220 communicates the first deal recommendation to user device 230, which displays the recommendation to the user via user interface 234. Interface 234 preferably comprises an electronic display that can provide a visual output. However, non-visual user outputs are also contemplated, including audio signals, olfactory signals, tactile signals (e.g., vibrations), and even taste sensations, or any combination thereof.

When the recommendation is visually communicated to the user, the visual communication could comprise a still image, a video image, an augment realty image, a virtual image, a game image, or any combination thereof. In some embodiments, the visual representation of the first deal recommendation could comprise an augmented real-time image signal of card 100. For example, image 240 received from user device 230 could be a real-time video image of card 100 and user interface module 220 could be configured to augment that real-time image with a representation of the first deal recommendation, such as by overlaying the real-time image with a graphical representation, textual representation, or even another real-time video signal, of a good or service. Module 220 could then transmit the augmented real-time image to the user via connection 250 and user interface 234. The overlaid object could be associated with image 240 in some manner (e.g., proximity, location, orientation, color scheme, functional interaction, etc.) so as to communicate to the user that the object is a recommendation.

Engine 210 may further include a tracking module that is configured to track a usage history of transaction card 100 by storing at least one usage characteristic (e.g., purchase, redemption, registration, activation) of transaction card in transaction database 290.

Figure 2B:
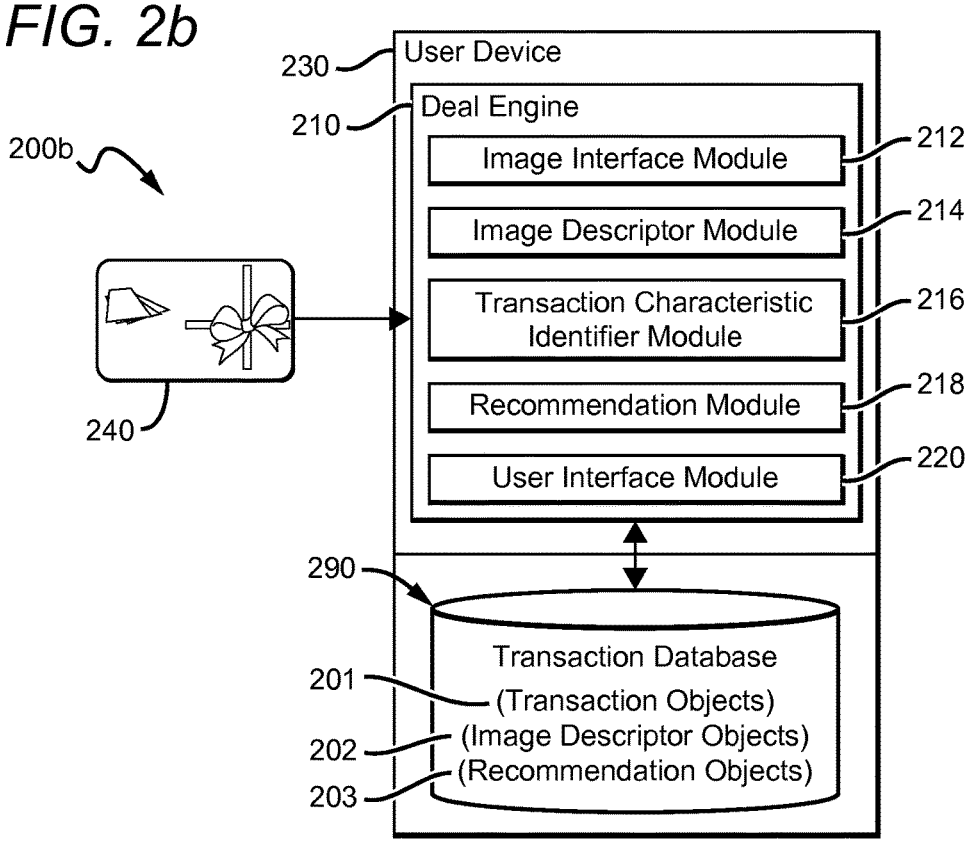
FIG. 2b is a schematic of another embodiment of a transaction system for pre-paid transaction cards.

FIG. 2b shows a system 200b, which is similar to system 200a except that deal engine 210 is stored and executed within user device 230. As a result, system 200b does not require an external connection (e.g., connection 250) to access and run the modules of deal engine 210. Instead, image 240 of card 100 is obtained via an image capturing device/component of user device 230, which is internally transmitted to image interface module 212.

In addition, FIG. 2b shows that transaction database 290 could also be stored internally within device 230, thus eliminating the need for an external connection (e.g., connection 251) to access database 290. Transaction database 290 could comprise one storage device or a plurality of storage devices. Objects 201, 202, and 203 can be stored in redundancy, in a distributed manner, or in any combination thereof.

Figure 2C:
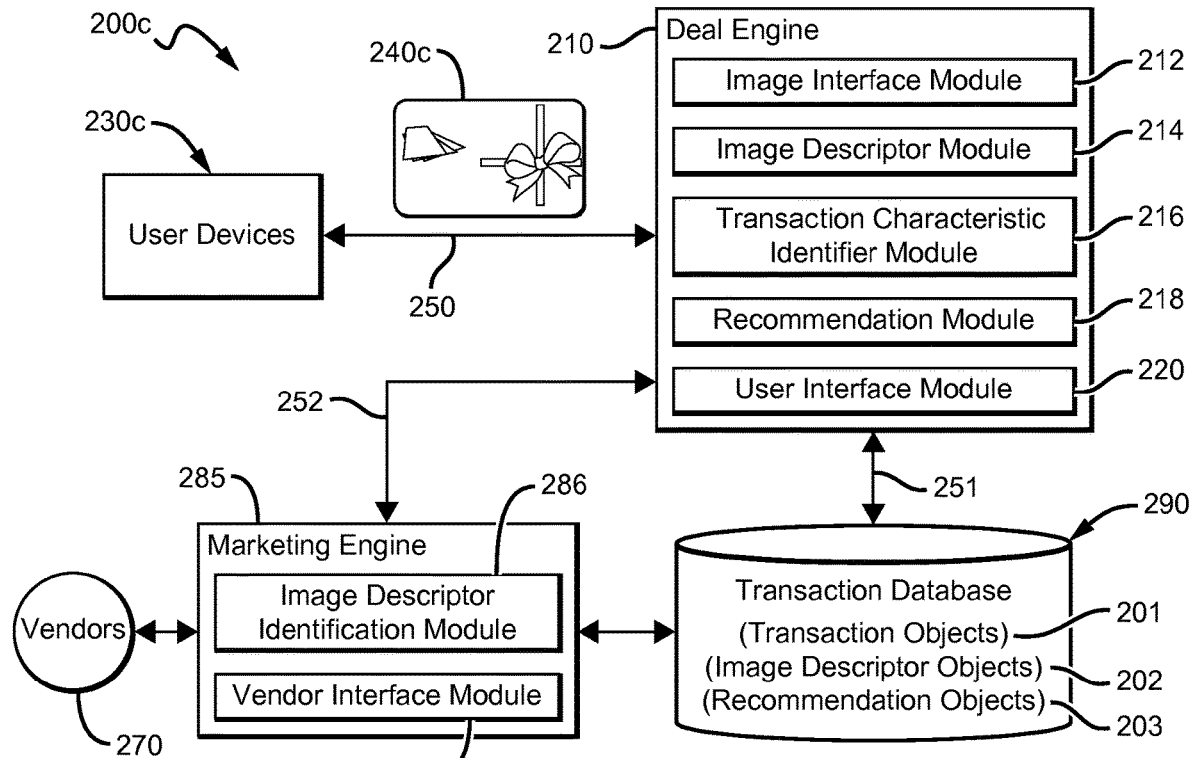
FIG. 2c is a schematic of another embodiment of a transaction system for pre-paid transaction cards.

FIG. 2c shows a system 200c, which is similar to system 200a. However, unlike system 200a, system 200c includes a plurality of user devices 230c that are in communication with deal engine 210 (and transaction database 290). In addition, system 200c has a marketing engine 285 communicatively coupled with transaction database 290. Marketing engine 285 has an image descriptor identification module 286 configured to identify a first subset of the image descriptors identified by module 214. Vendor Interface module 287 is configured to transmit the first subset of the image descriptors identified by module 286 to at least one of a plurality of vendors 270 as an advertising platform offer. The first subset of image descriptors can also be transmitted to a plurality of vendors, and the subset of image descriptors can be auctioned, bought, and/or sold. In such embodiments, market engine 285 functions as an advertising platform that allows vendors to reach groups of consumers that may not have been otherwise reachable. In some embodiments marketing engine 285 is in direct communication with deal engine 210 via connection 252.

The various advantages, features, and functions of the systems described above will be further illustrated by way of examples.

Example 1

John is turning twenty-one years old and decides to have a birthday party. John invites Kim to the party. Kim buys John a $50 pre-paid gift card as a present. Before giving John the gift card, Kim registers the gift card with a card sponsor (or card affiliate) through an online registration engine (accessible via a web browser). During registration, Kim provides various details about the gift card purchase and the intended recipient. For example, Kim provides John's name, age, city of residence, favorite sports teams, and favorite foods. Kim also selects "birthday" from a drop-down menu describing the reason for the gift. In addition, Kim types in a comment box several suggestions for redeeming the card, as well as a personal message to John.

Kim also provides the registration engine with a card number associated with the card, such as by typing in the number or by capturing and transmitting an image of the gift card. The registration engine uses the card number to store the registration information in a transaction database as transaction objects. The registration information is stored in an associated manner with the gift card number (e.g., the registration information is bound to the card number). The redemption engine also uses the card number to look-up purchase information about the gift card (e.g., date the gift card was purchased, by whom it was purchased, how much the gift card is worth, and location/store where the gift card was purchased, etc.) and store the purchase information as transaction objects on the database in an associated manner with the card number and/or registration information.

Figure 6A:
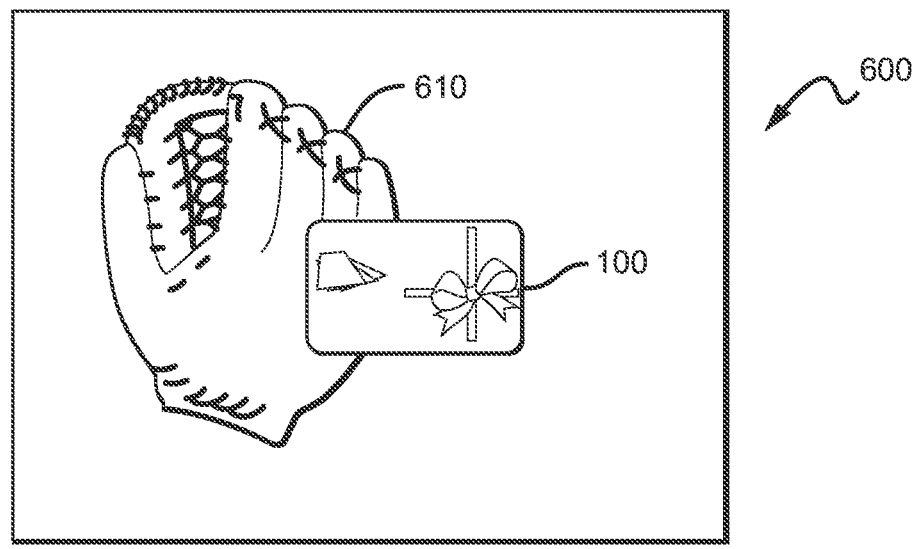
FIG. 6a is one embodiment of a user interface for displaying a deal recommendation associated with a pre-paid transaction card.

At the party, Kim gives John his gift card. John open's an app on his smart phone that connects to a deal recommendation engine, and starts recording a real-time video image of the gift card. The deal recommendation engine determines a first deal recommendation and displays the recommendation to John in the form of an augmented real-time video image, as shown in FIG. 6a. The augmented real-time video image includes (i) the real-time video image of the card and (ii) a graphical representation of the first deal recommendation, in this case an image of a baseball glove. The image of the baseball glove is a clickable link that takes John to an online ecommerce web site that offers the same glove for sale.

The deal engine constructed the first deal recommendation by deriving a set of image descriptors for a marker-less portion of the card and identifying the transaction objects on the transaction database that are associated with the card (e.g., registration information, purchase information). Once the transaction objects associated with the card were identified, the deal recommendation engine constructed deals (e.g., products, services, redemption options) relevant to those transaction objects. Using relevancy algorithms, the deal recommendation ranked the plurality of relevant deals and displayed the most relevant deal recommendation.

The augmented real-time video image shown in FIG. 6a could further display a value of the card along with Kim's redemption suggestions (or personal messages) that she provided during registration. The display could also include text instructing John to shake the phone, provide a voice command, or tap a button, to display a different deal recommendation (or additional deal recommendations).

After viewing the deal recommendation, John gives Kim a hug and says thank you for the gift card.

Example 2

Julie is the owner of a small business that has twenty employees. Julie has decided to give each of her employees a $1,000 pre-paid gift card as an end-of-the-year bonus. To decrease her costs, Julie has decided to purchase the gift cards using an online collaboration system. The system comprises a collaboration engine is communicatively coupled with a collaboration database. The database stores employer profiles, employee profiles, and vendor profiles. The purpose of the collaboration engine is to match employers with vendors that are willing to sponsor a portion of the value of the gift cards in exchange for an opportunity to advertise their goods and services to the gift card recipients (e.g., the employees).

First, Julie accesses the collaboration system via her web browser on her work desktop computer. Julie then provides employer profile data and employee profile data to the collaboration engine. Julie could provide the profile data by manually filling out an electronic or physical form and electronically or physically sending the form to the collaboration engine. Alternatively, Julie could provide the information simply by authorizing the collaboration engine to upload information from an employer database.

Employer profile data may include information such as the size of the employer (e.g., number of employees, number of offices), state of incorporation, physical locations, type of business (law firm, car manufacturer, airline and travel industry, etc.), and so forth. Employee profile data may include yearly salary, duration of time employed by the employer, residential address, number of dependents, marital status, ethnicity, gender, job title, and so forth. The collaboration system preferably requires employee approval/consent before receiving and using employee profile data.

Once Julie provides employer and employee profile data, the collaboration engine compares the employer and employee profile data with vendor data to identify an employer-vendor match (or matches). Vendor profile data could include type of business, size of business, user reviews/ratings, Better Business Bureau ratings, location, whether goods are manufactured domestically, a sponsorship dollar amount per gift card, a maximum number of gift card sponsorships, and so forth.

In this particular case, the collaboration engine matches Julie with three vendors, each of which is willing to contribute $100 to each gift card. The first vendor is an automotive repair service. The second vendor is a vacuum manufacturer. The third vendor is a home gardening and home maintenance service. The collaboration engine notifies Julie and the three vendors of the match and waits for confirmation from all parties. After Julie and the three vendors provide confirmation, the collaboration engine obtains funds from Julie and the three vendors (e.g., $700 per card from Julie and $100 per card from each of the three vendors) and completes a purchase of the gift cards. In some instances, the gift cards are sold by the entity hosting the collaboration system. In other instances, the collaboration system is hosted, managed, and run by a third party that is in collaboration with one or more gift card wholesalers or retailers.

Next, the collaboration engine ensures that the gift cards are sent to Julie, either electronically (e.g., email) or physically (e.g., by mail). Once Julie receives the cards, the cards can optionally be registered, either by Julie or by each recipient. Registration can occur in a manner similar to example 1 above. Registration information provided during registration can be more specific than the employee profile data to allow the vendors to personalize advertisements to each individual gift card recipient.

At the end-of-the-year work Christmas party, Julie gives each of her employees the pre-paid $1,000 gift card. The employees can access information about the gift cards (e.g., account balance, transaction events, etc.) by capturing a still or video image of the card and connecting to a deal recommendation engine via a web browser or software program on a user device (e.g., smart phone, tablet, laptop, etc.).

Figure 6B:
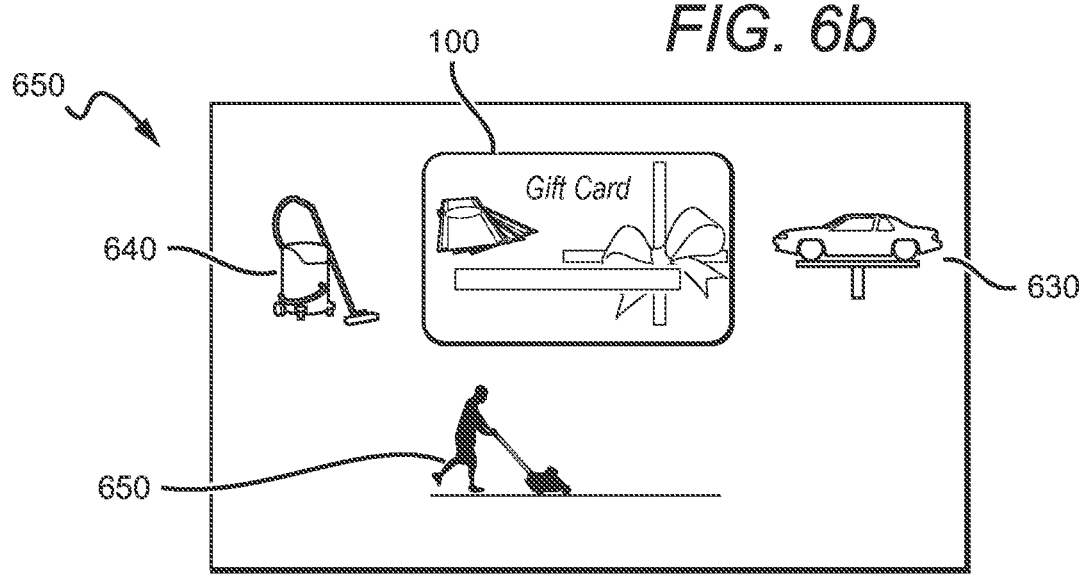
FIG. 6b is another embodiment of a user interface for displaying a deal recommendation associated with a pre-paid transaction card.

The deal recommendation engine is capable of recognizing a marker-less portion of the card as discussed above, and can display deal recommendations to the gift card recipient via the recipient's user device. FIG. 6b shows one example of a user display 650, which includes a real-time video image of card 100 overlaid with deal recommendations 630, 640, and 650. Deal recommendation 630 is an offer from the first vendor; deal recommendation 640 is an offer from the second vendor; and deal recommendation 650 is an offer from the third vendor.

The deal recommendations can be offers to sell a product or service at a price that is lower than, equal to, or higher than, a price that is normally offered. The deal recommendations are preferably personalized to each individual recipient, or at least to a group of recipients. Deal recommendation engine is configured to construct the deal recommendations using transaction data (e.g., registration information, gift card purchase information, employer profile data, employee profile data, vendor profile data, etc.) associated with each card. In some instances, deal recommendation is configured to operate automatically (without vendor input other then vendor profile data) and outside the view of the vendors in order to conserve the privacy of employee profile data and other transaction data. However, in other instances the vendors may have direct control on managing the construction of deal recommendations. In one aspect, the deal recommendation engine is configured to provide a list of constructed deal recommendations to the vendors for approval before displaying the deal recommendations to the gift card recipient.

In this manner, Julie can purchase gift cards for her employees at a reduced price while the three vendors are provided with an advertisement platform in which they can personalize offerings using consumer-specific data in a private and secure environment. In addition, the advertisement platform utilizes a fun augmented reality display that may increase offer conversion rates.

Example 3

A baseball team owner would like to increase game attendance by offering $100 gift cards to randomly selected attendees. Attendees can become eligible for the random selection by (i) electronically submitting a fan profile and (ii) playing a smart phone applet-game. The applet-game preferably has a fan profile form so that both (i) and (ii) can be performed within a single user environment. During the seventh inning stretch, the game announcer invites all the attendees to take out your smart phone, open the applet-game, and meet a specific objective of the game. In some instances the game objective might utilize an augmented reality display via the smart phone's screen. For example, the game objective could be to capture (e.g., record video or obtain a still image of) a specific baseball player on their smart phone camera (e.g., the next batter up, a big hitter player, the left fielder, the pitcher, etc.) and feed that player a "super power-up" food or drink via the augmented reality display.

Once a certain number of attendees have completed the objectives of the game, a random selection algorithm is used to select one or more of the eligible attendees for the $100 gift card. The gift cards are sent to the selected attendees electronically via the augmented reality game applet. The gift card can be displayed on the recipient's smart phone display, along with a first deal recommendation. To activate the gift card, the recipient must click the first deal recommendation. The deal recommendation is preferably constructed using fan profile data (e.g., number of games attended that season, favorite player, age, gender, other interests, etc.) and other transaction data as previously discussed. The deal recommendation engine is further configured to derive image descriptors of a marker-less portion of the digital gift card to identify the transaction objects stored on a transaction database and associated with the digital gift card. In one aspect, the image descriptors can be derived internally within the recipient's smart phone. In other instances, the recipient can display the digital gift card on the smart phone and use another image capturing device (e.g., another smart phone or a tablet, laptop, desktop, etc.) to capture an image of the digital gift card.

The deal recommendation engine could be further configured to present a first deal recommendation to the gift card recipient by augmenting a real-time video image of the recipient. For example, when the user records himself or herself, the first deal recommendation could show the image of the recipient overlaid with a hat or a shirt, suggesting that the recipient buy a specific type of hat or shirt.

The examples above are not intended to limit the application of the inventive principles described herein unless otherwise specified. Those of ordinary skill in the art will appreciate that numerous variations of the inventive concepts discussed above are possible.

Figure 3:
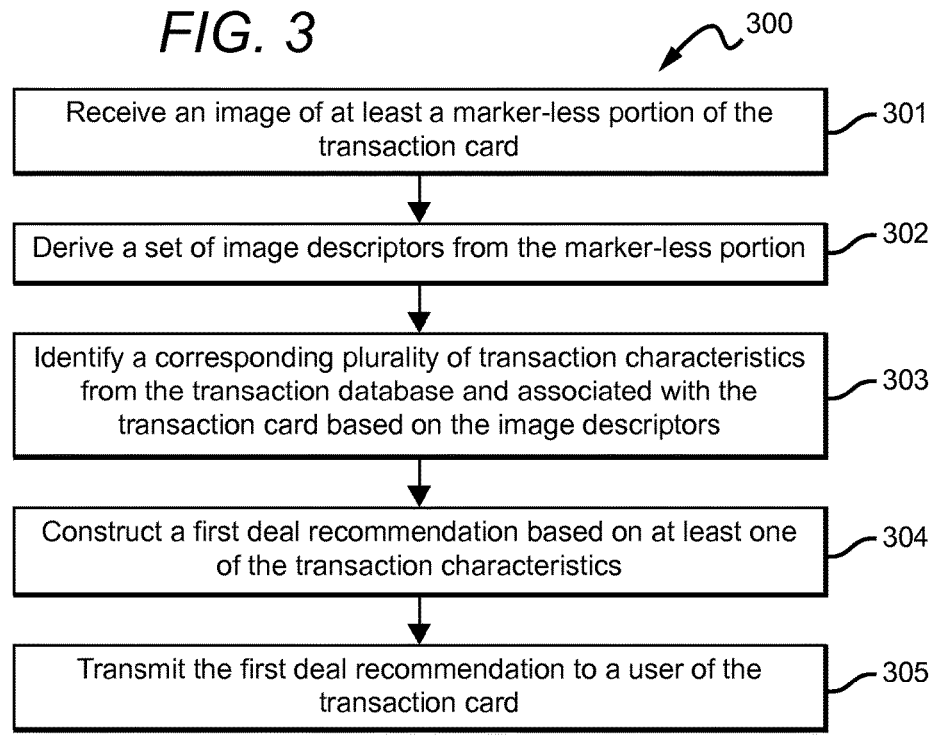
FIG. 3 is a schematic of a method of facilitating redemption of pre-paid transaction card.

FIG. 3 shows a method 300 of facilitating redemption of transaction card. The transaction card can be a gift card, a loyalty card, a health card, a credit card, a pre-paid debit card, a rebate card, a points card (e.g., game card; XboxLive, etc.) or any other token having a redeemable value.

Step 301 of method 300 is to receive an image of a marker-less portion of a transaction card. In some embodiments, the marker-less portion of the transaction card comprises one of a logo, a hologram, and a user image.

Step 302 is to derive a set of image descriptors from the marker-less portion. Deriving a set of image descriptors from the marker-less portion could include performing at least one of the following algorithmic methods: scale-invariant feature transform (SIFT), features from accelerated segment test (FAST), binary robust independent elementary feature (BRIEF), oriented fast and rotated BRIEF (ORB), binary robust invariant scalable keypoints (BRISK), fast retina keypoint (FREAK), speed-up robust feature (SURF), visual simultaneous localization and mapping (vSLAM), simultaneous localization and mapping (SLAM), and based upon related sequence types (BURST).

Step 303 is to identify a corresponding plurality of transaction characteristics from the transaction database and associated with the transaction card based on the image descriptors. Step 304 is to construct a first deal recommendation based on at least one of the transaction characteristics.

Examples of transaction characteristics include, but are not limited to, a buyer name, purchase date, purchase time, retail store, purchase location, beneficiary name, beneficiary gender, beneficiary age, and gift event (e.g., anniversary, birthday, get-well, condolences, congratulations, Christmas, Hanukah, etc). Step 305 is to transmit the first deal recommendation to a user of the transaction card. One example of a deal recommendation would be a promotion associated with a good and/or service.

In some embodiments, the first deal recommendation is a daily deal corresponding to a first date (e.g., purchase date of the gift card, date the gift card was received, date the gift card was registered by the recipient, etc.).

Figure 4:
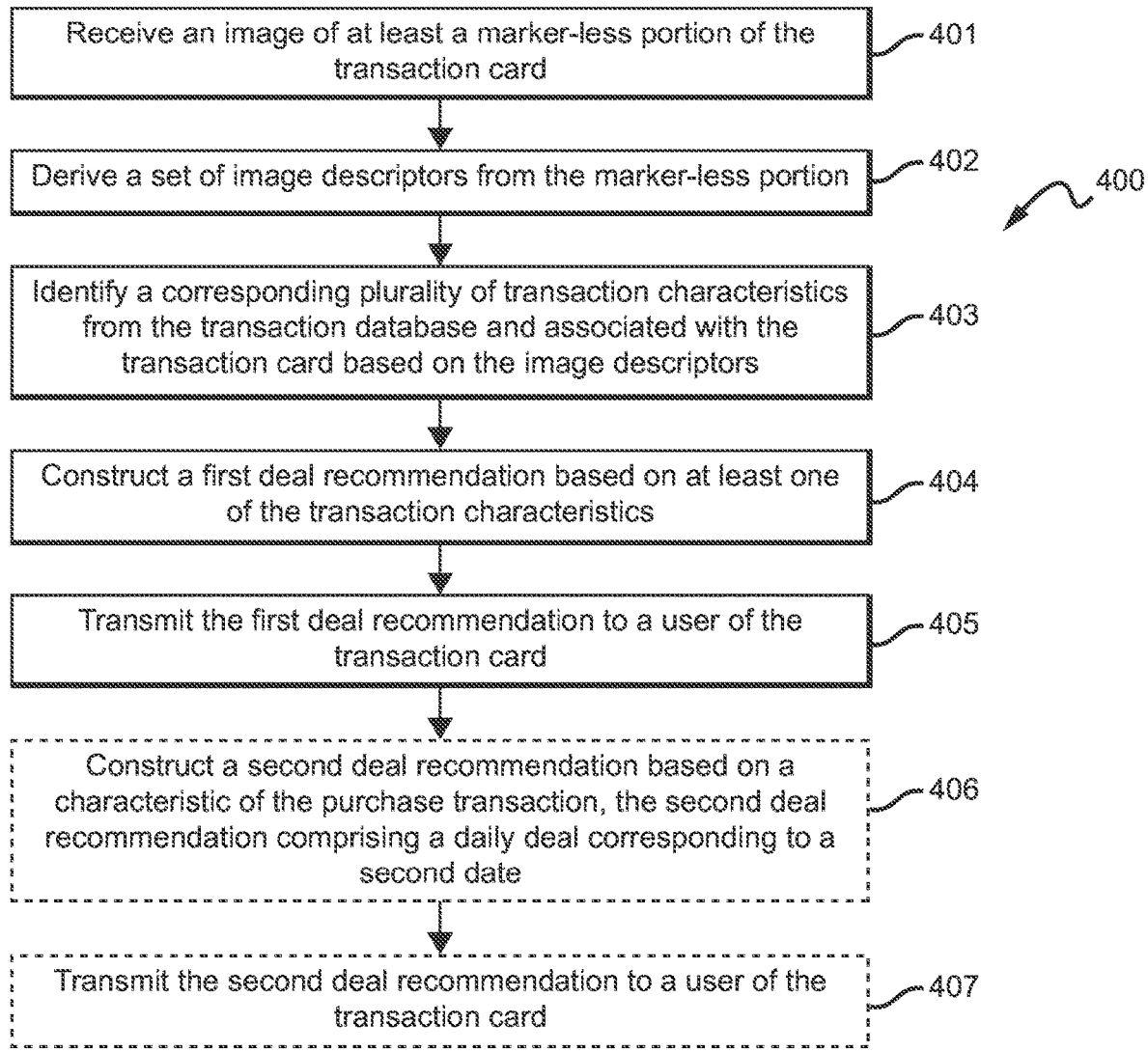
FIG. 4 is a schematic of another method of facilitating redemption of pre-paid transaction card.

FIG. 4 shows a method 400, which is another method of facilitating redemption of transaction card. Steps 401, 402, 403, 404, and 405 are similar to steps 301, 302, 303, 304, and 305 of method 300. However, method 400 includes additional steps 406 and 407. Step 407 is to construct a second deal recommendation based on a characteristic of the purchase transaction, the second deal recommendation comprising a daily deal corresponding to a second date. Step 407 is to transmit the second deal recommendation to a user of the transaction card.

FIG. 5 shows a method 500 of facilitating redemption of a transaction card. Steps 501, 502, 503, 504, are similar to steps—in method 300. However, step 504 of method 500 further comprises comprise steps 504a and/or 504b. Step 504a includes (i) identifying a current value of the transaction card, (ii) identifying a plurality of deals that fall within a predetermined range of the current value of the transaction card, and optionally (iii) ranking the plurality of deals according to a savings value of each of the deals (where the savings value is defined by a regular purchase price minus a discount purchase price). In some embodiments, the predetermined range is from 0 up to no more than the current value. In other embodiments the predetermined range is from 0 to no more than 20% of the current value.

Step 504b includes (i) receiving a deal selection criteria from the user and (ii) ranking the plurality of deals according to the deal selection criteria. The deal selection criteria could be of a type of good, a type of service, a price range, and a transaction type (e.g., in-store vs. online).

Method 500 also has a step 505a, which is to display an augmented real-time video signal to the user. The augmented real-time video signal can comprise a visual representation of the first deal recommendation overlaying a real-time video signal of the transaction card. The visual representation of the first deal recommendation could further include a hyperlink to an online retail website that offers for sale a good or service associated with the first deal recommendation.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A transaction system for pre-paid cards comprising:
a transaction database having a plurality of transaction objects stored therein, the transaction objects each representing at least one transaction characteristic of a transaction card, the transaction objects being stored according to associated image descriptor objects, wherein the transaction card has a particular marker-less portion, and
one or more processors communicatively coupled with the transaction database such that the one or more processors are caused to:
obtain an image of the particular marker-less portion of the transaction card;
derive at least one image descriptor corresponding to a visual characteristic of the particular marker-less portion by performing one or more image descriptor algorithms on the image of the particular marker-less portion, wherein the one or more image descriptor algorithms include at least one of a scale-invariant feature transform (SIFT), features from accelerated segment test (FAST), binary robust independent elementary feature (BRIEF), oriented fast and rotated BRIEF (ORB), binary robust invariant scalable keypoints (BRISK), fast retina keypoint (FREAK), speed-up robust feature (SURF), visual simultaneous localization and mapping (vSLAM), simultaneous localization and mapping (SLAM), and based upon related sequence types (BURST);
identify at least one corresponding transaction characteristic from the transaction database and associated with the transaction card based on the at least one image descriptor;
construct a first deal recommendation based on at least a subset of a plurality of transaction characteristics that includes data unique to a user of the transaction card, and another subset of the plurality of transaction characteristics that includes data unique to an original purchaser of the transaction card; and
generate, for a user device display, an augmented real-time image signal comprising a visual representation of the first deal recommendation combined with a still image or real-time video signal of at least the particular marker-less portion of the transaction card.

2. The system of claim 1, wherein the image of the particular marker-less portion of the transaction card comprises at least one of a still image, a video image, an augment realty image, a virtual image, and a game image.

3. The system of claim 1, wherein the one or more processors transmit the first deal recommendation to the user of the transaction card via a client device comprising one of a cell phone, smart phone, tablet, phablet, laptop, and computer.

4. The system of claim 1, wherein the first deal recommendation corresponds to a plurality of purchases that are available to the user of the transaction card.

5. The system of claim 1, wherein the visual representation overlays the still image or real-time video signal proximal to the particular marker-less portion of the transaction card.

6. The system of claim 1, wherein the one or more processors track a usage history of the transaction card by storing at least one usage characteristic of the transaction card in the transaction database.

7. The system of claim 1, wherein the at least one image descriptor is bound to at least one of time, location, and context.

8. The system of claim 1, wherein the at least one image descriptor is bound to at least one of a deal and a promotion.

9. The system of claim 1, wherein characteristics of the particular marker-less portion have not been pre-stored in a lookup database in an object-specific manner for identification purposes.

10. The system of claim 1, wherein the one or more processors identify the at least one corresponding transaction characteristic by comparing image descriptors with image descriptor objects saved on the transaction database and associated with various transaction cards.

11. The system of claim 1, wherein the one or more processors transmit a first subset of image descriptors to a first vendor, where the first subset of the image descriptors determines an advertising platform offer.

12. The system of claim 1, wherein the one or more processors identify a first subset of image descriptors to determine an advertising platform offer.

13. A method of facilitating redemption of a transaction card, comprising steps of:

obtaining an image of a particular marker-less portion of the transaction card;

deriving at least one image descriptor corresponding to a visual characteristic of the particular marker-less portion by performing one or more image descriptor algorithms on the image of the particular marker-less portion, wherein the one or more image descriptor algorithms include at least one of a scale-invariant feature transform (SIFT), features from accelerated segment test (FAST), binary robust independent elementary feature (BRIEF), oriented fast and rotated BRIEF (ORB), binary robust invariant scalable keypoints (BRISK), fast retina keypoint (FREAK), speed-up robust feature (SURF), visual simultaneous localization and mapping (vSLAM), simultaneous localization and mapping (SLAM), and based upon related sequence types (BURST);

identifying at least one corresponding transaction characteristic from a transaction database and associated with the transaction card based on the at least one image descriptor;

constructing a first deal recommendation based on at least a subset of a plurality of transaction characteristics that includes data unique to a user of the transaction card, and another subset of the plurality of transaction characteristics that includes data unique to an original purchaser of the transaction card; and generating, for a user device display, an augmented real-time image signal comprising a visual representation of the first deal recommendation combined with a still image or real-time video signal of at least the particular marker-less portion of the transaction card.

14. The method of claim 13, wherein the step of constructing the first deal recommendation based on at least a subset of the plurality of transaction characteristics further comprises ranking a plurality of deals according to a savings value of each of the deals, wherein the savings value is defined by a regular purchase price minus a discount purchase price.

15. The method of claim 13, wherein the step of constructing the first deal recommendation based on at least a subset of the plurality of transaction characteristics further comprises:

receiving a deal selection criteria from the user of the transaction card; and ranking a plurality of deals according to the deal selection criteria.

16. The method of claim 15, wherein the deal selection criteria comprises at least one of a type of good, a type of service, a price range, and a transaction type.

17. The method of claim 13, wherein the first deal recommendation comprises a promotion associated with at least one of a good and service.

18. The method of claim 13, wherein at least one of the plurality of transaction characteristics is one of a buyer name, purchase date, purchase time, retail store, purchase location, beneficiary name, beneficiary gender, beneficiary age, and gift event.

19. The method of claim 13, wherein the transaction card comprises at least one of: a gift card, a loyally card, a health card, a credit card, a pre-paid debit card, a rebate card, a points card.

20. The method of claim 13, wherein the visual representation of the first deal recommendation further comprises a hyperlink to an online website that offers for sale a good or service associated with the first deal recommendation.

21. The method of claim 13, wherein the first deal recommendation includes a daily deal corresponding to a first date.

22. The method of claim 13, further comprising the steps of:

constructing a second deal recommendation based on a characteristic of a purchase transaction, the second deal recommendation comprising a daily deal corresponding to a second date; and transmitting the second deal recommendation to the user of the transaction card.

23. The method of claim 13, wherein the particular marker-less portion of the transaction card comprises one of a logo, a hologram, and a user image.

24. The method of claim 13, wherein characteristics of the particular marker-less portion have not been pre-stored in a lookup database in an object-specific manner for identification purposes.

25. The method of claim 13, wherein the step of identifying at least one corresponding transaction characteristic comprises comparing image descriptors with image descriptor objects stored on the transaction database and associated with various transaction cards.

26. The method of claim 13, further comprising transmitting a first subset of image descriptors to a first vendor as an advertising platform offer.

27. At least one non-transitory computer-readable medium having computer instructions stored thereon, which, when executed by at least one processor, cause the at least one processor to perform one or more operations comprising:

obtaining an image of a particular marker-less portion of a transaction card;

deriving at least one image descriptor corresponding to a visual characteristic of the particular marker-less portion by performing one or more image descriptor algorithms on an image of the particular marker-less portion, wherein the one or more image descriptor algorithms include at least one of a scale-invariant feature transform (SIFT), features from accelerated segment test (FAST), binary robust independent elementary feature (BRIEF), oriented fast and rotated BRIEF (ORB), binary robust invariant scalable keypoints (BRISK), fast retina keypoint (FREAK), speed-up robust feature (SURF), visual simultaneous localization and mapping (vSLAM), simultaneous localization and mapping (SLAM), and based upon related sequence types (BURST);

identifying at least one corresponding transaction characteristic from a transaction database and associated with the transaction card based on the at least one image descriptor;

constructing a first deal recommendation based on at least a subset of a plurality of transaction characteristics that includes data unique to a user of the transaction card, and another subset of the plurality of transaction characteristics that includes data unique to an original purchaser of the transaction card; and generating, for a user device display, an augmented real-time image signal comprising a visual representation of the first deal recommendation combined with a still image or real-time video signal of at least the particular marker-less portion of the transaction card.

28. The system of claim 1, wherein the one or more processors are further caused to generate an augmented real-time image signal comprising a visual representation of the first plurality of deal recommendations overlaying a real-time video signal of the transaction card from an image capture device.

\* \* \* \* \*